United States Patent [19]

Marlow et al.

[11] Patent Number: 4,794,336

[45] Date of Patent: Dec. 27, 1988

[54] APPARATUS FOR SURVEYING A BOREHOLE COMPRISING A MAGNETIC MEASUREMENT PROBE TO BE MOVED WITHIN A DRILL PIPE TO A MEASURMENT POSITION WITHIN A NON-MAGNETIC COLLAR

[75] Inventors: Peter J. C. Marlow; Kenneth S. Evans, both of Cheltenham, England

[73] Assignee: NL Sperry-Sun, Inc., Stafford, Tex.

[21] Appl. No.: 87,094

[22] Filed: Aug. 19, 1987

[30] Foreign Application Priority Data

Sep. 4, 1986 [GB] United Kingdom ............... 8621385

[51] Int. Cl.⁴ .................. G01N 27/72; G01V 3/26; G01V 7/00; E21B 47/09
[52] U.S. Cl. ................................ 324/221; 73/151; 166/66.5; 166/255; 324/346
[58] Field of Search ............ 324/220, 221, 226, 346; 33/302; 166/250, 255, 66.5; 175/40, 45; 73/151, 152

[56] References Cited

U.S. PATENT DOCUMENTS

| 2,246,542 | 6/1941 | Smith | 324/346 X |
| 2,766,426 | 10/1956 | Wilhelm | 324/346 X |
| 3,393,732 | 7/1968 | Murphey et al. | 324/221 X |
| 3,745,446 | 7/1973 | Norris | 324/346 |
| 4,320,340 | 3/1982 | Lichtenberg | 324/221 |
| 4,365,197 | 12/1982 | Pyatt et al. | 324/221 |
| 4,472,680 | 9/1984 | Wellington | 324/221 |

Primary Examiner—Gerard R. Strecker
Attorney, Agent, or Firm—Browning, Bushman, Zamecki & Anderson

[57] ABSTRACT

A single-shot or multi-shot measurement probe incorporates a magnetic field sensor for sensing the earth's magnetic field, a processing unit for determining from the output of the sensor that the probe has moved from within a section of a drill pipe made predominantly of magnetizable material to within a collar made of substantially non-magnetizable material, and a switching unit for initiating the taking of one or more survey measurements by the probe when an output is received from the processing unit indicating that the probe has entered the collar. The probe further incorporates a gravity sensor for sensing the earth's gravitational field and a further processing unit for determining from the output of the gravity sensor that movement of the probe has stopped and for controlling the switching unit such that the taking of one or more survey measurements by the probe is not initiated until after receipt of an output from the further processing unit indicating that movement of the probe has stopped.

8 Claims, 1 Drawing Sheet

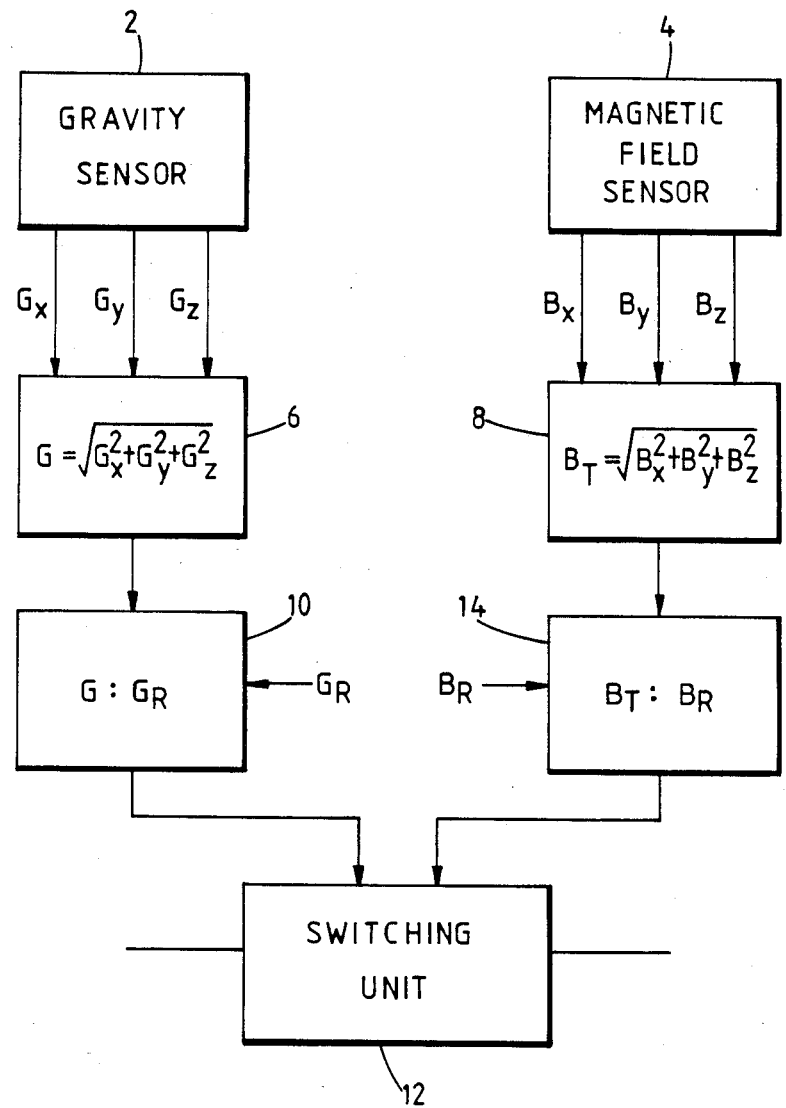

APPARATUS FOR SURVEYING A BOREHOLE COMPRISING A MAGNETIC MEASUREMENT PROBE TO BE MOVED WITHIN A DRILL PIPE TO A MEASURMENT POSITION WITHIN A NON-MAGNETIC COLLAR

BACKGROUND OF THE INVENTION

This invention relates to the surveying of boreholes, and is more particularly concerned with the taking of measurements down-hole by means of a measurement probe which is moved within a drill pipe made predominantly of magnetizable material to a measurement position within a collar made of substantially non-magnetizable material.

It is standard practice to take a series of survey measurements in the vicinity of the end of a borehole while it is being drilled by lowering a single-shot or multi-shot measurement probe on the end of a line down the hollow drill string to a measurement position close to the drill bit, and by subsequently withdrawing the probe by drawing it up the inside of the drill string after the measurements have been taken, the measurement data being subsequently retrieved at the surface. The measurement probe will generally include a gravity sensor comprising three accelerometers for measuring three mutually perpendicular components of the earth's gravitational field, and three fluxgates for measuring three mutually perpendicular components of the earth's magnetic field. Furthermore, in order to ensure that the magnetizable material of the drill string has as little effect as possible on the magnetic field measurements, it is usual for the measurement position to be located within one or more drill collars made of substantially non-magnetic material.

It is also conventional for the measurement probe to incorporate a position sensor for indicating when the probe has reached the measurement position and for initiating the taking of survey measurements when that position has been reached. One such position sensor is disclosed in U.S. Pat. No. 4,365,197. This sensor includes a metal detecting arrangement comprising a coil which is supplied with an energising current as the probe is moved along the drill string and which creates a varying magnetic field in the vicinity of the coil. As long as the probe is within a section of the drill string made of magnetizable material, the magnetic field associated with the coil will be substantially confined by the walls of the drill string. However, when the probe enters a collar made of substantially non-magnetizable material, eddy currents will be induced in the walls of the collar by the varying magnetic field and these currents will in turn produce magnetic fields which will give rise to additional currents in the coil superimposed on the energising current. Accordingly detection of a change in the current through the coil can be used to determine that the probe has passed from a section of drill string made of magnetizable material to within the non-magnetizable drill collar.

It is an object of the invention to provide a generally improved arrangement for detecting when a measurement probe has moved from within a section of the drill pipe made of predominantly magnetizable material to within a collar made of substantially non-magnetizable material, and more particularly an arrangement which does not require the provision of a special position detecting coil for producing eddy currents in the non-magnetizable collar.

SUMMARY OF THE INVENTION

According to the present invention there is provided apparatus for surveying a borehole comprising a measurement probe to be moved within a drill pipe made predominantly of magnetizable material to a measurement position within a collar made of substantially non-magnetizable material, the probe incorporating transducer means for sensing the earth's magnetic field, processing means for determining from the output of the transducer means that the probe has moved from within a section of the drill pipe made predominantly of magnetizable material to within the collar made of substantially non-magnetizable material, and switching means for initiating the taking of one or more survey measurements by the probe when an output is received from the processing means indicating that the probe has entered the collar made of substantially non-magnetizable material.

Since detection is made on the basis of sensing of the earth's magnetic field, no special coil is required for producing a separate magnetic field for detection purposes. Furthermore the probe will generally in any case include magnetic field transducers for taking survey measurements, so that the same transducers may be used for the purposes of the position detection.

In a preferred embodiment of the invention the probe further incorporates gravity sensing means for sensing the earth's gravitational field and further processing means for determining from the output of the gravity sensing means that movement of the probe has stopped and for controlling the switching means such that the taking of one or more survey measurements by the probe is not initiated until after receipt of an output from the further processing means indicating that movement of the probe has stopped.

The transducer means is preferably arranged to sense three components of the earth's magnetic field along three mutually transverse directions. In this case the processing means may comprise calculating means for deriving a value for the total earth's magnetic field from the sensed components of the earth's magnetic field.

Furthermore the processing means may include comparison means for comparing a sensed or derived value for the earth's magnetic field with a predetermined reference value and for controlling the switching means in dependence on the result of the comparison.

In addition the gravity sensing means is preferably arranged to sense three components of the earth's gravitational field along three mutually transverse directions. In this case the further processing means may comprise further calculating means for deriving a value for the total earth's gravitational field from the sensed components of the earth's gravitational field.

The further processing means may include further comparison means for comparing a sensed or derived value for the earth's gravitational field with a predetermined reference value and for controlling the switching means in dependence on the result of the comparison.

The probe may further include timer means for inhibiting operation of the probe until a preset time after initiation of the survey.

BRIEF DESCRIPTION OF THE DRAWING

In order that the invention may be more fully understood, a preferred embodiment of the invention will now be described by way of example with reference to the accompanying drawing in which the single FIGURE is a block diagram of position detection circuitry within the probe.

DETAILED DESCRIPTION OF THE DRAWING

Referring to the FIGURE the probe incorporates a gravity sensor unit 2 comprising three accelerometers for measuring three components $G_X$, $G_Y$ and $G_Z$ of the earth's gravitational field along three mutually perpendicular axes X, Y and Z fixed in relation to the probe, the Z axis being along the longitudinal axis of the probe. In addition the probe includes a magnetic field sensor unit 4 comprising three fluxgates for measuring three components $B_X$, $B_Y$ and $B_Z$ of the earth's magnetic field along the three mutually perpendicular axes X, Y and Z.

The measurements $G_X$, $G_Y$ and $G_Z$ taken by the gravity sensor unit 2 are supplied to a calculating unit 6 which derives a value for the total earth's gravitational field G from the expression:

$$G = \sqrt{G_X^2 + G_Y^2 + G_Z^2}$$

The measurements $B_X$, $B_Y$ and $B_Z$ taken by the magnetic field sensor unit 4 are supplied to a calculating unit 8 which derives a value for the total earth's magnetic field $B_T$ from the expression:

$$B_T = \sqrt{B_X^2 + B_Y^2 + B_Z^2}$$

The value G is examined in a comparator unit 10 and is compared with a reference value $G_R=1$. When a match is found between the value G and the value $G_R$ within an allowed tolerance range, a signal is outputted by the comparator unit 10 to a switching unit 12 indicating that movement of the probe has stopped.

The value $B_T$ is examined in a comparator unit 14 and is compared to a reference value $B_R$ which represents a reference value for the earth's magnetic field at the location of the borehole as previously supplied to the probe from a look-up table or after prior measurement. When a match is found between the value $B_T$ and the value $B_R$ within an allowed tolerance range, a signal is outputted from the comparator unit 14 to the switching unit 12 indicating that the probe has entered the collar made of substantially nonmagnetizable material.

When the outputs of the comparator units 10 and 14 indicate that the probe has stopped within the non-magnetizable collar, that is in the measurement position, the switching unit 12 is switched so as to initiate taking of survey measurements after a warm-up period as determined by a timer. At the end of the warm-up period a series of sets of measurements are taken at ten second intervals. Each set of measurements generally includes at least the values $G_X$, $G_Y$, $G_Z$, $B_X$, $B_Y$, $B_Z$ and the temperature T as measured by a suitable temperature sensor.

In order to save power, it is preferred that a variable delay circuit is provided so that power is not supplied to the position detection circuitry until a preset interval of time after introduction of the probe into the drill pipe, which preset interval is determined to be less than the time which it takes for the probe to reach the measurement position.

In a variant of the above described position detection circuitry a unit is provided for monitoring the value of $G_Z$ and for outputting a signal to the switching unit 12 when the value $G_Z$ becomes substantially stable indicating that the movement of the probe has stopped. Such a unit may be provided in addition to or instead of the unit 6.

In a further variant of the position detection circuitry a unit is provided for calculating the dip angle from the outputs of the magnetic field sensor 4, and a comparator unit is provided for comparing the calculated dip angle to a reference value and for outputting a value to the switching unit 12 when a match is found between the two values within an allowed tolerance range, indicating that the probe is within the non-magnetizable collar. This unit and associated comparator unit may be provided in addition to or instead of the unit 8 and comparator unit 14.

The dip angle $\lambda$ is calculated from the expression:

$$\lambda = \arctan(B_V/B_H)$$

where
$B_V = B_Z \cos\theta - B_X' \sin\theta$
$B_H = \sqrt{(B_T^2 - B_V^2)}$
$B_X' = B_X \cos\phi - B_Y \sin\phi$
where $\theta$ and $\phi$ are respectively the inclination angle and the highside angle calculated from the expressions:

$\cos\theta = G_Z/G$ $\sin\theta = G_{XY}/G$ $\cos\phi = -G_X/G_{XY}$ $\sin\phi = G_Y/G_{XY}$ where $G_{XY} = \sqrt{(G_X^2 + G_Y^2)}$ In another variant the gravity sensor unit 2, the calculating unit 6 and the comparator unit 10 may all be dispensed with, so that the position of the probe is determined entirely from the magnetic field measurements.

However, it is preferred that the circuit should successively perform the following steps:
(i) determine whether $G_Z$ is substantially stable,
(ii) if $G_Z$ is substantially stable, determine whether G satisfies the condition $1.2 > G > 0.8$,
(iii) if G satisfies this condition, determine whether $B_T$ substantially corresponds to $B_R$,
(iv) if $B_T$ substantially corresponds to $B_R$, determine whether the calculated dip angle corresponds to a reference value, and
(v) if the calculated dip angle substantially corresponds to the reference value, initiate the taking of survey measurements after a suitable delay.

We claim:
1. Apparatus for surveying a borehole, comprising a measurement probe for taking magnetic measurements to be moved within a drill pipe made predominantly of magnetizable material to a measurement position within a collar made of substantially non-magnetizable material, the probe incorporating magnetic sensing means for sensing the earth's magnetic field and for providing an output dependent on the sensed magnetic field, comparison means for comparing said output with a reference value indicative of the earth's magnetic field at the location of the collar made of substantially nonmagnetizable material and for providing an output dependent on the result of the comparison, and detection means for detecting from the output of the comparison means when the probe has moved from within a section of the drill pipe made predominantly of magnetizable material to within the collar made of substantially nonmagnetizable material and for providing an output in response to such detection, and switching means for initiating the taking of one or more survey measurements by the probe when an output is received from the detection means indicating that the probe has entered the collar made of substantially nonmagnetizable material.

2. Apparatus according to claim 1, wherein the probe further incorporates gravity sensing means for sensing the earth's gravitational field and for providing an output dependent on the sensed gravitational field, and further detection means for determining from the output of the gravity sensing means that movement of the probe has stopped and for controlling the switching means such that the taking of one or more survey measurements by the probe is not initiated until after receipt of an output from the further detection means indicating that movement of the probe has stopped.

3. Apparatus according to claim 1, wherein the magnetic sensing means is arranged to sense three components of the earth's magnetic field along three mutually transverse directions.

4. Apparatus according to claim 3, wherein the magnetic sensing means includes calculating means for deriving a value for the total earth's magnetic field from the sensed components of the earth's magnetic field.

5. Apparatus according to claim 2, wherein the gravity sensing means is arranged to sense three components of the earth's gravitational field along three mutually transverse directions.

6. Apparatus according to claim 6, wherein the gravity sensing means includes further calculating means for deriving a value for the total earth's gravitational field from the sensed components of the earth's gravitational field.

7. Apparatus according to claim 2, wherein the further detection means includes further comparison means for comparing a sensed or derived value for the earth's gravitational field with a predetermined reference value and for controlling the switching means in dependence on the result of the comparison.

8. Apparatus according to claim 1, wherein the probe further includes timer means for inhibiting operation of the probe until a preset time after initiation of the survey.

* * * * *